F. PARRISH.
HARNESS HOOK.
APPLICATION FILED DEC. 17, 1912.
1,079,661.
Patented Nov. 25, 1913.
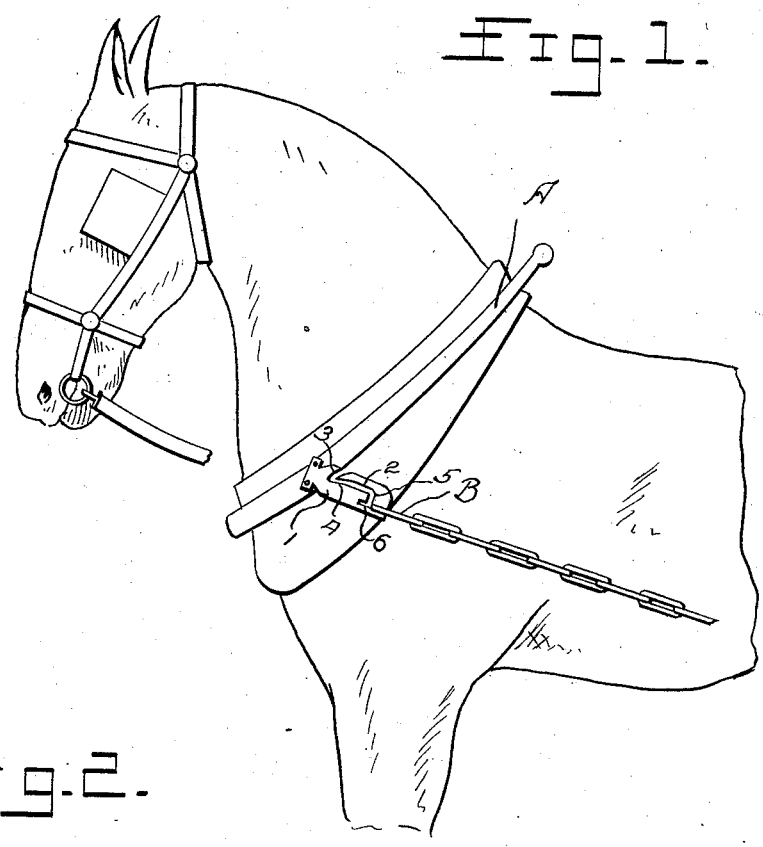
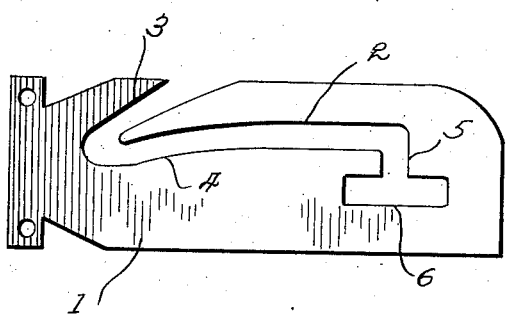
Witnesses
Francis Mac Nerhany
J. M. Cullinan
Inventor
F. Parrish,
By
Attorney

UNITED STATES PATENT OFFICE.

FERRELL PARRISH, OF WEST DURHAM, NORTH CAROLINA.

HARNESS-HOOK.

1,079,661.

Specification of Letters Patent. Patented Nov. 25, 1913.

Application filed December 17, 1912. Serial No. 737,353.

*To all whom it may concern:*

Be it known that I, FERRELL PARRISH, a citizen of the United States, residing at West Durham, in the county of Durham and State of North Carolina, have invented certain new and useful Improvements in Harness-Hooks, of which the following is a specification.

My invention relates to hooks for harness and is especially applicable to devices for securing the forward ends of the tugs to the hames and has for its object the provision of a hook formed of a metal plate provided with a rearwardly extending slot having a T-shaped slot communicating with said rearwardly extending slot into which the link on the end of the tug drops and engages to effectually hold the forward end of the tug in engagement with the hames.

My invention will be described in detail hereinafter and illustrated in the accompanying drawings, in which, Figure 1 is a view of my improved hook secured to harness hames and showing the tug secured thereto; and Fig. 2, an enlarged view of the hook detached from the hames.

In the drawings similar reference characters will be used to designate corresponding parts in both views.

In Fig. 1 my improved hook is shown attached to hames A of ordinary construction and consists of a plate of metal 1 secured rigidly to or pivotally mounted on the hames A as desired, the hook shown in Fig. 1 being rigidly secured to the hames, but I do not wish to confine myself to this construction as it may be secured in any other manner found desirable without altering the spirit of my invention. The plate 1 is provided with a rearwardly extending slot 2 having its forward terminal communicating with the upper edge of the plate by means of an upwardly and rearwardly inclined slot 3 that is flared outwardly as shown to permit of the easy entrance and removal of a link such as shown at B in Fig. 1 secured to the forward end of a harness tug. The slot 2 is as shown curved slightly upwardly from the forward terminal as shown at 4 and has its rear terminal provided with a downwardly extending slot 5 and a cross-slot 6, said slots 5 and 6 forming an inverted T-shaped slot as clearly shown in the drawings, the cross slots 6 being adapted to receive the link B finally, and the draft being sustained thereby.

It will be apparent that by this construction of hook the link B will be effectually held in engagement therewith, and all danger of accidental release of the link B when strain is relieved on the link will be eliminated as the tendency of the link B when strain is relieved and any forward movement thereof takes place, is to simply move in the cross slots 6 and the link would not enter the upwardly extending slot 5 except when lifted into said slot 5 by hand in releasing the tug link B from the hook.

Having thus described my invention, what I claim is:—

A harness hook comprising a rectangular plate, said plate provided with a rearwardly extending slot, said slot extending slightly in an inclined plane to the forward end thereof, the forward end of said slot provided with an upwardly and rearwardly extending slot, said last mentioned slot provided with a cut-away portion providing means for an easy access thereto and the rearward end of first mentioned slot provided with a downwardly extending, inverted, T-shaped slot.

In testimony whereof I affix my signature in presence of two witnesses.

FERRELL PARRISH.

Witnesses:
E. G. BELUIE,
W. V. HOLMES.

Copies of this patent may be obtained for five cents each, by addressing the "Commissioner of Patents, Washington, D. C."